United States Patent
Wu et al.

(10) Patent No.: US 8,270,685 B2
(45) Date of Patent: Sep. 18, 2012

(54) FINGERPRINT READER

(75) Inventors: Wei Wu, Shenzhen (CN); Xin Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 571 days.

(21) Appl. No.: 12/608,947

(22) Filed: Oct. 29, 2009

(65) Prior Publication Data

US 2011/0012758 A1   Jan. 20, 2011

(30) Foreign Application Priority Data

Jul. 15, 2009  (CN) .......................... 2009 1 0304385

(51) Int. Cl.
*G06K 9/00*   (2006.01)
(52) U.S. Cl. .......................................... 382/124; 341/20
(58) Field of Classification Search .......... 382/115–126; 341/20
See application file for complete search history.

(56) References Cited

U.S. PATENT DOCUMENTS

| | | | | |
|---|---|---|---|---|
| 3,804,524 A | * | 4/1974 | Jocoy et al. | 356/138 |
| 6,496,630 B2 | * | 12/2002 | Iwai et al. | 385/120 |
| 7,139,414 B1 | * | 11/2006 | Suzuki et al. | 382/126 |
| 7,379,569 B2 | * | 5/2008 | Chikazawa et al. | 382/124 |

* cited by examiner

*Primary Examiner* — Brian Young
(74) *Attorney, Agent, or Firm* — Altis Law Group, Inc.

(57) ABSTRACT

The present invention provides a fingerprint reader for an electronic device. The fingerprint reader includes a cover, a support member, two sliding rails, a sliding block, a slide groove, a first protruding portion, a second protruding portion, and a collection header. The support member defines a button exposed on one side of the electronic apparatus. The sliding block is engaged with the sliding groove, and the first protruding portion is latched in the slideway of one sliding rail and the second protruding portion is latched in the slideway of the other sliding rail. When the button is pressed, the sliding block touches the sliding groove to push the two protruding portions to move along the corresponding slideways from up to down at the same time, the first sliding block moves along a first orientation, the cover tilts along a second orientation and the collection header is exposed to outside.

7 Claims, 7 Drawing Sheets

FINGERPRINT READER

BACKGROUND

1. Technical Field

The disclosure relates to biological recognition devices and, more particularly, to a fingerprint reader for an electronic apparatus.

2. Description of the Related Art

Fingerprint readers become more and more popular. However, a collection header of a fingerprint reader is exposed outside all the time and can easily get dirty due to being exposed to a lot of dust and powder. As a result, fingerprints from the collection header become inaccurate and the fingerprint reader generates a wrong result. Moreover, the collection header may be scraped by some solids and results in that the fingerprint reader does not work.

BRIEF DESCRIPTION OF THE DRAWINGS

The components in the drawings are not necessarily drawn to scale, the emphasis instead being placed upon clearly illustrating the principles of the fingerprint reader. Moreover, in the drawings, like reference numerals designate corresponding parts throughout the several views.

DETAILED DESCRIPTION

Figure 1:
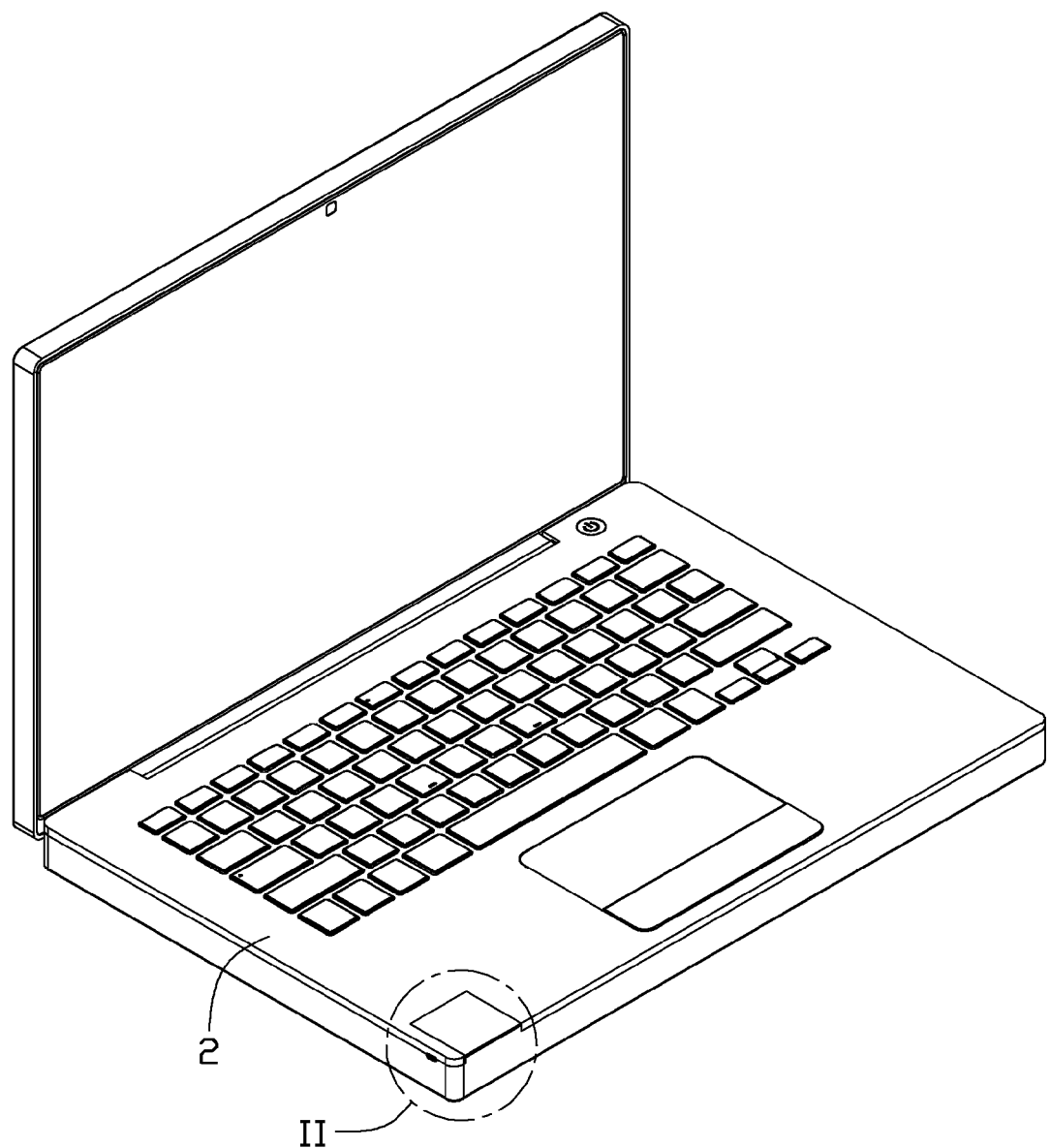
FIG. 1 is a schematic view of a fingerprint reader for a notebook computer in a close state in accordance with an embodiment.
Figure 2:
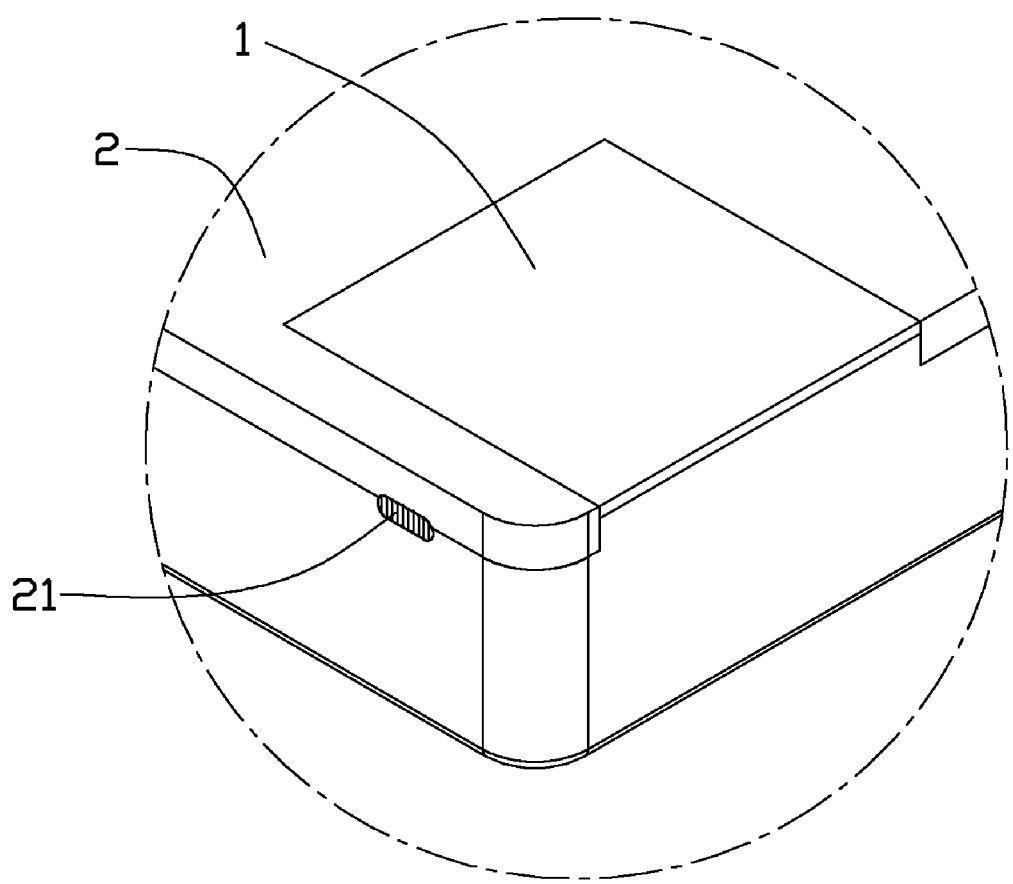
FIG. 2 is an enlarged view of the encircled portion of II of FIG. 1.

Referring to FIGS. 1 and 2, a fingerprint reader 1 is fixed in a corner of a notebook computer 2 and is in a closed state. The notebook computer 2 is notched to accommodate the fingerprint reader 1. However, it should be noted that the fingerprint reader 1 can be utilized for other electronic apparatuses, not limited to the notebook computer 2 herein.

Figure 3:
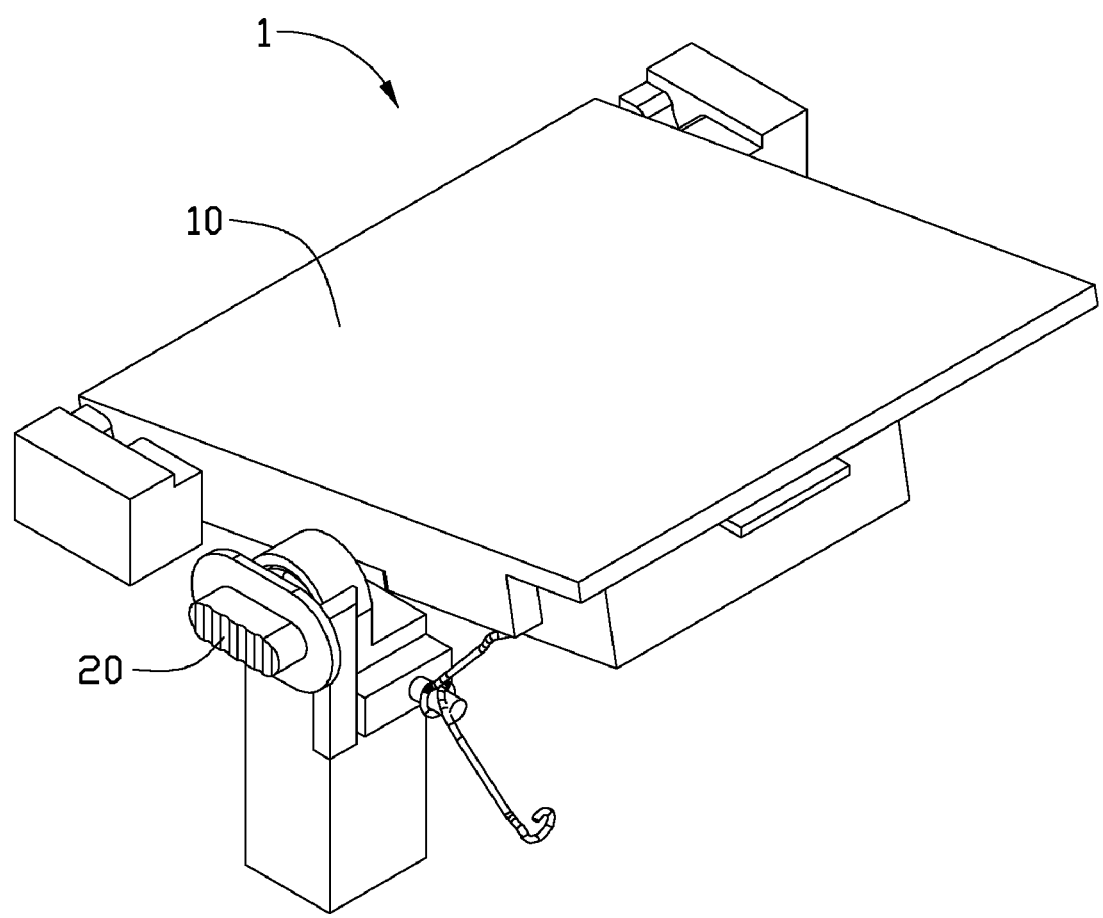
FIG. 3 is a perspective view of the fingerprint reader of FIG. 1.
Figure 4:
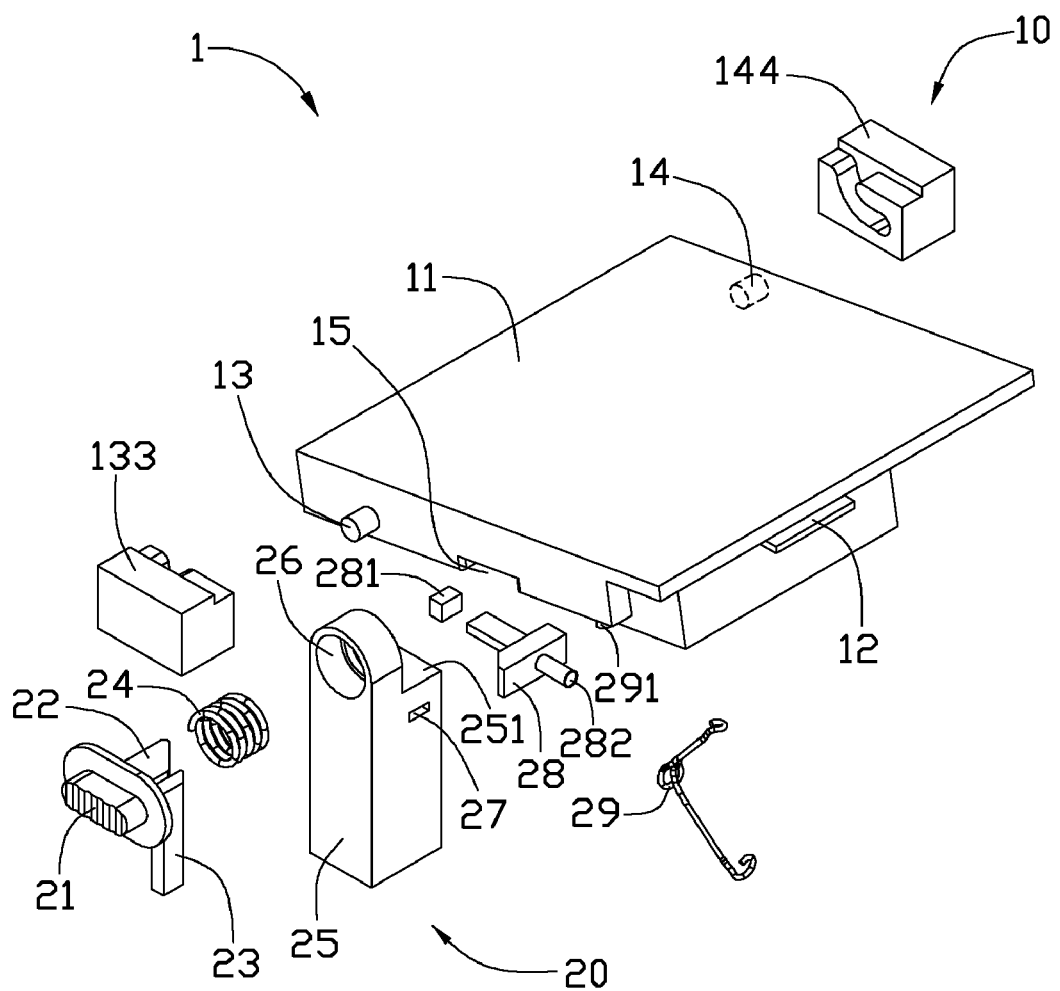
FIG. 4 is an exploded, perspective view of the fingerprint reader of FIG. 3.
Figure 5:
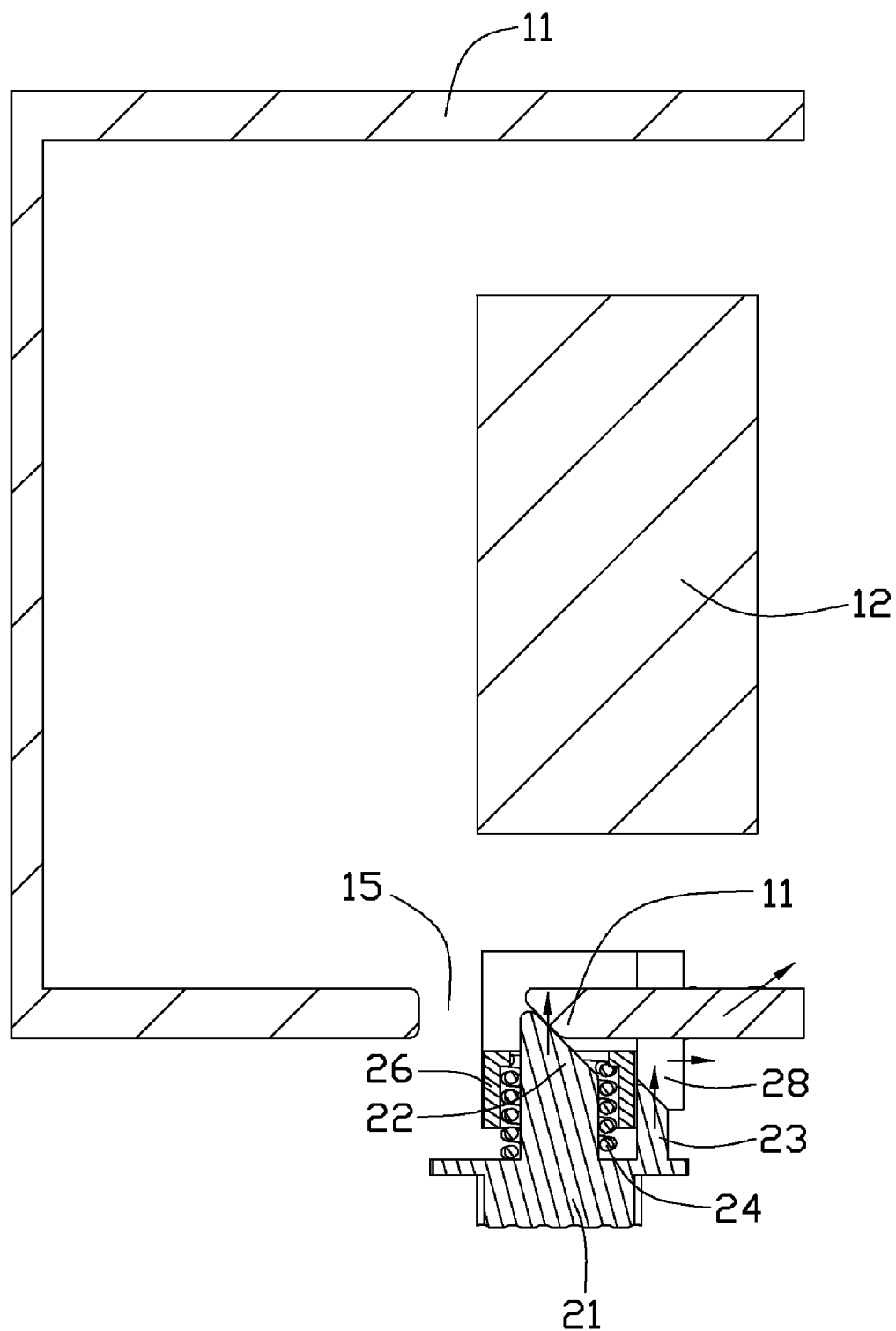
FIG. 5 is a schematic view of a sliding block of a pressing member touching another sliding block of a cover of the fingerprint reader of FIG. 3.

Referring to FIGS. 3-5, the fingerprint reader 1 includes a body 10 and a support member 20. A button 21 of the support member 20 is exposed on one side of the notebook computer 2. The body 10 includes a cover 11, a collection header 12, a first sliding rail 133, and a second sliding rail 144. The cover 11 is exposed on the notebook computer 2. The notebook computer 2 holds the first sliding rail 133 and the second sliding rail 144, the first sliding rail 133 defines a slideway from up to down, and the second sliding rail 144 defines a slideway the same as the slideway of the first sliding rail 133.

The bottom side of one sidewall of the cover 11 is formed a sliding groove 15, and a first protruding portion 13 is extended from the same sidewall as the sliding groove 15. A second protruding portion 14 is extended from another sidewall of the cover 11. The first protruding portion 13 is latched in the slideway of the first sliding rail 133 and the second protruding portion 14 is latched in the slideway of the second sliding rail 144. A third protruding portion 291 is on the bottom of the cover 11. In this embodiment, the sliding groove 15 is a trapezium. The collection header 12 is under the cover 11 and for collecting fingerprints.

The support member 20 further includes a coil spring 24, a holder 25, and a first sliding block 28. A second sliding block 22 and a third sliding block 23 are connected with the button 21. The coil spring 24 encircles the second sliding block 22.

A plane 251 is formed on an end face of the holder 25, a circular through hole 26 is defined at the top of the holder 25, and a rectangle through hole 27 is defined in the sidewalls of the holder 25. A magnet 281 covers one end of the rectangle through hole 27. The plane 251 supports the cover 11 and the sliding groove 15 is on the plane 251. A diameter of one end of the circular through hole 26 is smaller than that of the other end of the circular through hole 26. The circular through hole 26 accommodates the coil spring 24 and the second sliding block 22. A diameter of the coil spring 24 is between the diameters of the two ends of the circle through hole 26. The coil spring 24 is in the circular through hole 26 and the second sliding block 22 drills through the circular through hole 26 to the sliding groove 15 on the plane 251. The second sliding block 22 is engaged with the sliding groove 15. The third sliding block 23 is engaged with the first sliding block 28.

The first sliding block 28 is latched with the rectangle through hole 27. The magnet 281 attracts one end of the first sliding block 28. A forth protruding portion 282 is extended from the other end of the first sliding block 28, and a torsion spring 29 is twisted on the forth protruding portion 282. One end of the torsion spring 29 is twisted on the third protruding portion 291 of the cover 11, and the other end of the torsion spring 29 is twisted on the notebook computer 2.

Figure 6:
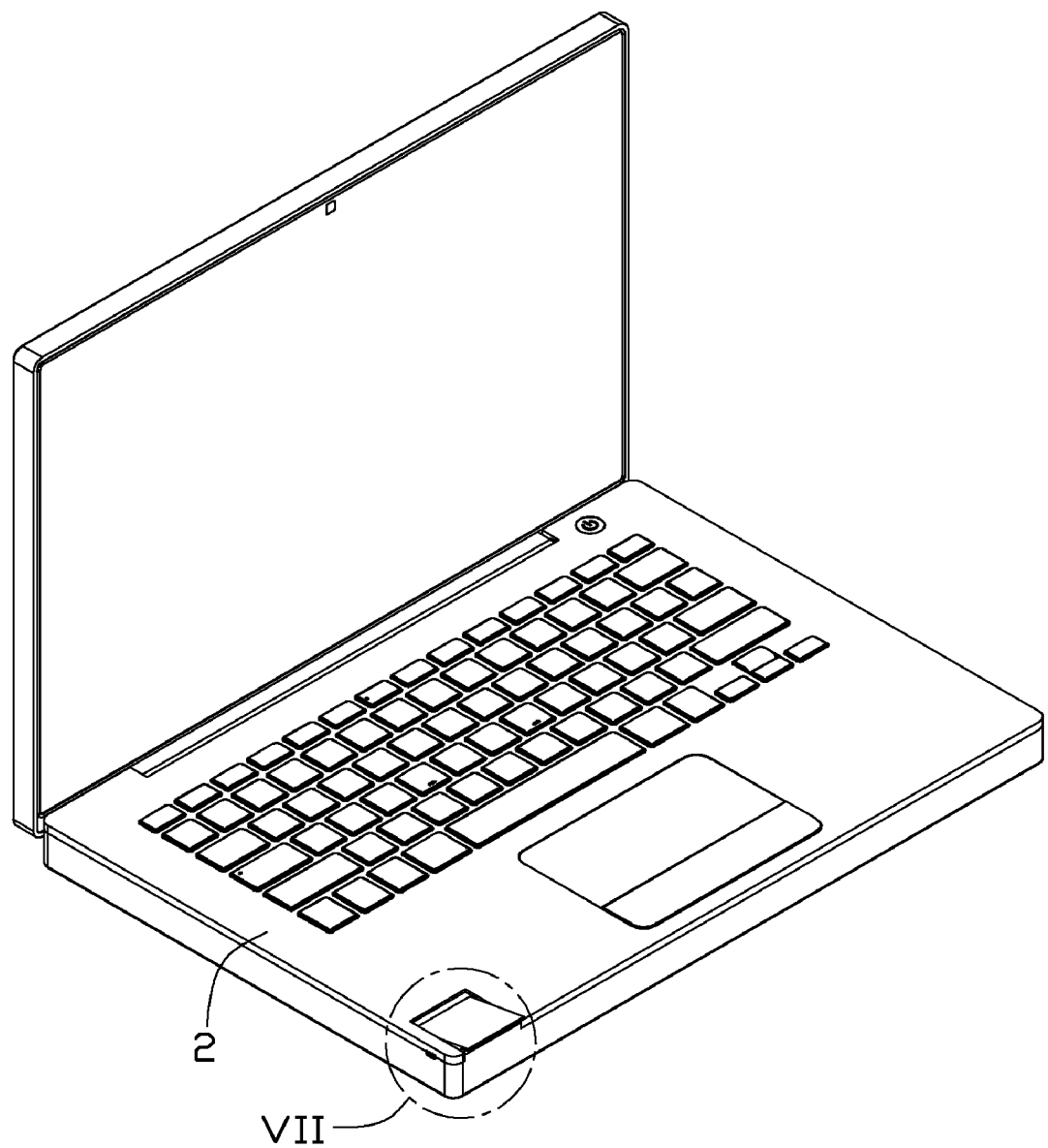
FIG. 6 is a schematic view of the fingerprint reader of FIG. 1 in an open state.
Figure 7:
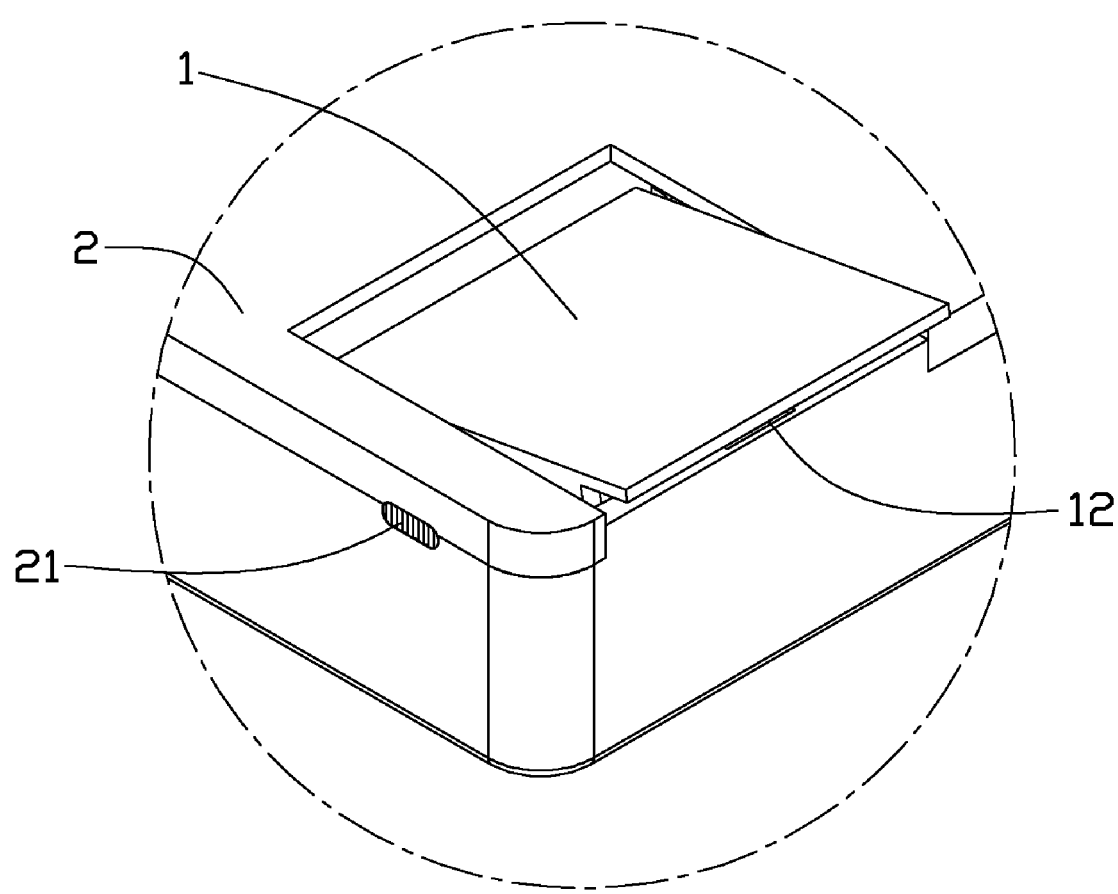
FIG. 7 is an enlarged view of the encircled portion of VII of FIG. 6.

Referring to FIGS. 6 and 7, the button 21 is pressed so that the second sliding block 22 touches and pushes the sliding groove 15 to generate a first force on the cover 11 and the third sliding block 23 pushes the first sliding block 28 to generate a second force on the first sliding block 28. The second sliding block 22 moves along a first orientation and the cover 11 moves along a second orientation. The third sliding block 23 moves along the first orientation and the first sliding block 28 moves along a third orientation. The first protruding portion 13 slides along the slideway of the first sliding rail 133 and the second protruding portion 14 slides along the slideway of the second sliding rail 144, from up to down at the same time due to the first force. The first sliding block 28 removes a predetermined space from the rectangle through hole 27 due to the second force and the torsion spring 29 deforms to support the cover 11. Accordingly, the cover 11 tilts along the second orientation and the collection header 12 is exposed to outside.

The coil spring 24 is compressed in the circle through hole 26 and deforms due to the first force. When the pressing action stops, the coil spring 24, the button 21, the second sliding block 22, and the third sliding block 23 all resume their initial state.

When the tilted cover 11 is pushed down, the torsion spring 29 deforms again to push the first sliding block 28 back to the rectangle through hole 27 and the magnet 281 attracts the first sliding block 28. The first protruding portion 13 slides along the slideway of the first sliding rail 133 and the second protruding portion 14 slides along the slideway of the second sliding rail 144, from down to up at the same time. Accordingly, the fingerprint reader 1 resumes its initial state.

When the button 21 on the fingerprint reader 1 is pressed, the cover 11 tilts and the collection header 12 is exposed to outside for collecting fingerprints in the open state. When the tilted cover 11 is pushed down, the fingerprint reader 1 resumes the closed state to avoid the environment influence.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A fingerprint reader for an electronic apparatus, comprising:
   a cover exposed on the electronic apparatus;
   a collection header disposed under the cover;
   a support member supporting the cover and defining a sliding block;
   two sliding rails supported by the electronic apparatus and defining two slideways from up to down;
   a button of the support member exposed on one side of the electronic apparatus;
   a sliding groove formed on the bottom side from one sidewall of the cover;
   a first protruding portion extended from the same sidewall as the sliding groove;
   a second protruding portion extended from another sidewall of the cover;
   wherein the sliding block is engaged with the sliding groove, the first protruding portion is latched in the slideway of one sliding rail and the second protruding portion is latched in the slideway of the other sliding rail; when the button is pressed, the sliding block touches the sliding groove to push the two protruding portions to move along the corresponding slideways from up to down at the same time, the sliding block moves along a first orientation, and the cover tilts along a second orientation and the collection header is exposed to outside.

2. The fingerprint reader as recited in claim 1, wherein the sliding block is encircled a coil spring, the support member further comprises a circular through hole, the diameter of one end of the circle through hole is smaller than the other end of the circular through hole, the circular through hole accommodates the sliding block and the coil spring is in the circular through hole, when the button is pressed, the coil spring is compressed in the circular through hole, and when the pressing action stops, the coil spring and the button resumes the initial state.

3. The fingerprint reader as recited in claim 1, further comprising first sliding block, wherein a rectangle through hole is defined on one side of the support member, the first sliding block is latched in the rectangle through hole, a third protruding portion and a torsion spring are mounted on one end of the first sliding block, and one end of the torsion spring is connected to the cover and the other end is connected to the electronic apparatus.

4. The fingerprint reader as recited in claim 3, wherein the support member further comprises a third sliding block, the third sliding block is engaged with the another sliding block, when the button is pressed, the third sliding block pushes the another sliding block and the another sliding block removes a predetermined space from the rectangle through hole to support the cover.

5. The fingerprint reader as recited in claim 4, wherein when the tilted cover is pushed down, the torsion spring deforms to push the another sliding block back to the rectangle through hole, the first protruding portion slides along the slideway of the first sliding rail and the second protruding portion slides along the slideway of the second sliding rail from down to up at the same time, and the fingerprint reader resumes the initial state.

6. The fingerprint reader as recited in claim 5, wherein a magnet covers one end of the rectangle through hole, when the another sliding block moves back to the rectangle through hole, the magnet attracts the another sliding block.

7. The fingerprint reader as recited in claim 1, wherein the sliding groove is trapezium shaped.

* * * * *